US011454696B2

(12) United States Patent
Tsvelykh et al.

(10) Patent No.: US 11,454,696 B2
(45) Date of Patent: Sep. 27, 2022

(54) FMCW RADAR INTEGRATION WITH COMMUNICATION SYSTEM

(71) Applicant: Infineon Technologies AG, Neubiberg (DE)

(72) Inventors: Ivan Tsvelykh, Munich (DE); Ashutosh Baheti, Munich (DE); Samo Vehovc, Unterhaching (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 710 days.

(21) Appl. No.: 16/376,945

(22) Filed: Apr. 5, 2019

(65) Prior Publication Data

US 2020/0319327 A1 Oct. 8, 2020

(51) Int. Cl.
| | |
|---|---|
| *G01S 7/00* | (2006.01) |
| *G01S 13/933* | (2020.01) |
| *G01S 13/58* | (2006.01) |
| *G01S 13/931* | (2020.01) |
| *G05D 1/00* | (2006.01) |
| *G05D 1/02* | (2020.01) |
| *G05D 1/06* | (2006.01) |
| *G01S 7/02* | (2006.01) |

(52) U.S. Cl.
CPC ............. *G01S 7/006* (2013.01); *G01S 7/023* (2013.01); *G01S 13/583* (2013.01); *G01S 13/931* (2013.01); *G01S 13/933* (2020.01); *G05D 1/0022* (2013.01); *G05D 1/0257* (2013.01); *G05D 1/0607* (2013.01); *G01S 2013/9316* (2020.01)

(58) Field of Classification Search
CPC ........ G01S 7/006; G01S 7/023; G01S 13/882; G01S 13/931; G05D 1/002; G05D 1/0257
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,191,649 B1 * | 2/2001 | Sugita | H04L 27/2273 329/304 |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

(Continued)

*Primary Examiner* — Peter M Bythrow
(74) *Attorney, Agent, or Firm* — Slater Matsil, LLP

(57) ABSTRACT

In an embodiment, a millimeter-wave system includes a first circuit having M channels, one or more antennas coupled to the first circuit, and a controller that includes a resource scheduler module. The controller is configured to operate the millimeter-wave system as a radar device and as a communication device based on an output of the resource scheduler module.

26 Claims, 11 Drawing Sheets

(56) References Cited

U.S. PATENT DOCUMENTS

| | | |
|---|---|---|
| 6,310,513 B1* | 10/2001 | Iemura .................. H03D 3/009 329/304 |
| 6,414,631 B1 | 7/2002 | Fujimoto |
| 6,459,742 B1* | 10/2002 | Marque-Pucheu ......................... H04L 25/03834 332/144 |
| 6,636,174 B2 | 10/2003 | Arikan et al. |
| 6,693,580 B1* | 2/2004 | Wehling .................. G01S 13/87 342/45 |
| 7,048,973 B2 | 5/2006 | Sakamoto et al. |
| 7,057,564 B2 | 6/2006 | Tsai et al. |
| 7,068,704 B1* | 6/2006 | Orr ........................ G01S 5/145 375/139 |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 7,978,123 B2* | 7/2011 | Lam ........................ G01S 7/006 342/134 |
| 7,994,969 B2 | 8/2011 | Van Caekenberghe et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,325,545 B2* | 4/2016 | Ray ........................ H04L 27/0008 |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,082,562 B1* | 9/2018 | Abari .................... G01S 13/343 |
| 10,175,340 B1* | 1/2019 | Abari .................... G01S 13/931 |
| 2003/0102997 A1 | 6/2003 | Levin et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0148688 A1* | 6/2011 | Sutphin .................. G01S 7/006 342/28 |
| 2011/0299433 A1 | 12/2011 | Darabi et al. |
| 2012/0032833 A1* | 2/2012 | Milligan ................ G01S 7/006 342/59 |
| 2012/0087230 A1 | 4/2012 | Guo et al. |
| 2012/0092205 A1* | 4/2012 | Bourdelais ............. G01S 7/006 342/21 |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2013/0176161 A1* | 7/2013 | Derham .................. G01S 13/04 342/27 |
| 2014/0028542 A1 | 1/2014 | Lovitt et al. |
| 2014/0035774 A1* | 2/2014 | Khlifi ...................... G01S 7/006 342/21 |
| 2014/0070994 A1 | 3/2014 | Schmalenberg et al. |
| 2014/0145883 A1 | 5/2014 | Baks et al. |
| 2014/0266857 A1* | 9/2014 | Mayer .................... G01S 7/006 342/60 |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2015/0378004 A1* | 12/2015 | Wilson-Langman ... G01S 7/003 342/52 |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1* | 6/2016 | Trotta .................... G01S 13/931 342/175 |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0282462 A1* | 9/2016 | Pitts ....................... H01Q 13/06 |
| 2016/0291130 A1 | 10/2016 | Ginsburg et al. |
| 2016/0299215 A1 | 10/2016 | Dandu et al. |
| 2016/0306034 A1* | 10/2016 | Trotta .................... G01S 7/006 |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0334511 A1* | 11/2016 | Ling ...................... G01S 13/931 |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0062948 A1* | 3/2017 | Artemenko ............. H01Q 1/38 |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0214746 A1* | 7/2017 | Zettler .................... H04L 67/12 |
| 2017/0310758 A1* | 10/2017 | Davis ..................... G01S 13/878 |
| 2017/0364160 A1 | 12/2017 | Malysa et al. |
| 2018/0046255 A1 | 2/2018 | Rothera et al. |
| 2018/0071473 A1 | 3/2018 | Trotta et al. |

(56) References Cited

U.S. PATENT DOCUMENTS

| | | | |
|---|---|---|---|
| 2018/0095161 | A1* | 4/2018 | Kellum .................... G01S 13/10 |
| 2018/0101239 | A1 | 4/2018 | Yin et al. |
| 2018/0128898 | A1* | 5/2018 | Seler ....................... G01S 7/006 |
| 2018/0180713 | A1* | 6/2018 | Cohen ..................... G01S 13/32 |
| 2018/0199377 | A1* | 7/2018 | Sanderovich ..... H04W 74/0816 |
| 2018/0241822 | A1 | 8/2018 | Davis et al. |
| 2018/0341014 | A1* | 11/2018 | Pesik .................... G01S 13/882 |
| 2018/0348339 | A1* | 12/2018 | Lien ........................ G01S 7/006 |
| 2018/0348340 | A1* | 12/2018 | Lien .......................... H04B 1/44 |
| 2019/0056476 | A1* | 2/2019 | Lin ....................... G01S 13/931 |
| 2019/0250261 | A1* | 8/2019 | Itkin ........................ H04B 1/44 |
| 2019/0293748 | A1* | 9/2019 | Gulati ................. H04W 74/004 |
| 2019/0293781 | A1* | 9/2019 | Bolin ...................... G01S 13/86 |
| 2019/0377075 | A1* | 12/2019 | Tsfati ..................... H04B 17/27 |
| 2020/0033442 | A1* | 1/2020 | Gulati ................... G01S 7/0234 |
| 2020/0309933 | A1* | 10/2020 | Ray ........................ H03D 3/007 |
| 2021/0003661 | A1* | 1/2021 | Xu ........................ G01S 7/0235 |
| 2021/0041549 | A1* | 2/2021 | Kerner .................... G01S 13/34 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| CN | 106911605 A | 6/2017 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWRIxxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chui et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

(56) References Cited

OTHER PUBLICATIONS

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.
Keysight Technologies, First Steps in 5G, "Overcoming New Radio Device Design Challenges Series", Nov. 2017, 7 pages.
Sun, G. et al., "Signal Processing Techniques in Network-Aided Positioning", IEEE Signal Processing Magazine, Jul. 2005, 12 pages.
Sakpere, W. et al., "A state-of-the-art survey of indoor positioning and navigation systems and technologies", University of Bologna, Italy, Sheridan College, Australia, University of Zululand, Richards Bay, South Africa, SACJ 29 (3) Dec. 2017, 53 pages.

\* cited by examiner

FMCW RADAR INTEGRATION WITH COMMUNICATION SYSTEM

TECHNICAL FIELD

The present invention relates generally to an electronic system and method, and, in particular embodiments, to a frequency-modulated continuous-wave (FMCW) radar integration with communication system.

BACKGROUND

Applications in the millimeter-wave (mmWave) frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuitry used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a millimeter-wave system includes a first circuit having M channels, one or more antennas coupled to the first circuit, and a controller that includes a resource scheduler module. The controller is configured to operate the millimeter-wave system as a radar device and as a communication device based on an output of the resource scheduler module.

In accordance with an embodiment, a millimeter-wave system includes a first circuit having a plurality of radio-frequency (RF) channels that are configured to be coupled to an antenna array and a controller. The first circuit is configured to transmit and receive RF signals through the antenna array. The controller is configured to perform radar operations and communication operations using the first circuit. The controller is operable to dynamically reconfigure the millimeter-wave system to multiplex between performing radar operations and communication operations based on an output of a scheduler module.

In accordance with an embodiment, a method of operating a millimeter-wave system includes: receiving a radar request; receiving a communication request; allocating hardware resources of the millimeter-wave system for radar operations and for communication operations based on the radar request and the communication request; performing radar operations with the hardware resources of the millimeter-wave system allocated for radar operations; and performing communication operations with the hardware resources of the millimeter-wave system allocated for communication operations.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention will be described with respect to embodiments in a specific context, a millimeter-wave system that operates as an FMCW radar and as a 5G communication system. Embodiments of the present invention may be used with other frequency ranges and with different hardware implementations.

In an embodiment of the present invention, a millimeter-wave system is configurable for operating as a millimeter-wave communication device and/or as a millimeter-wave radar device. In some embodiments, the millimeter-wave system may operate as a communication device and as a radar device simultaneously. In some embodiments, the communication link is established in a particular millimeter-wave band (e.g., as established by a particular 5G standard or pre-standard) and the radar operations are performed in an adjacent industrial, scientific and medical (ISM) band(s). Performing the radar functions in an adjacent ISM band advantageously introduces a separation in frequency that allows for radar and communication functions to be performed simultaneously without substantial deteriorating performance of the radar or of the communication operations that may be caused by interference between radar and communication radiation. Some embodiments may also use space separation (e.g., by directing radar beams and communication beams toward different directions) and/or time separation (e.g., by operating the millimeter-wave system as a communication device and as a radar device at different times, such as by using time division multiplexing or time division duplexing).

Figure 1:
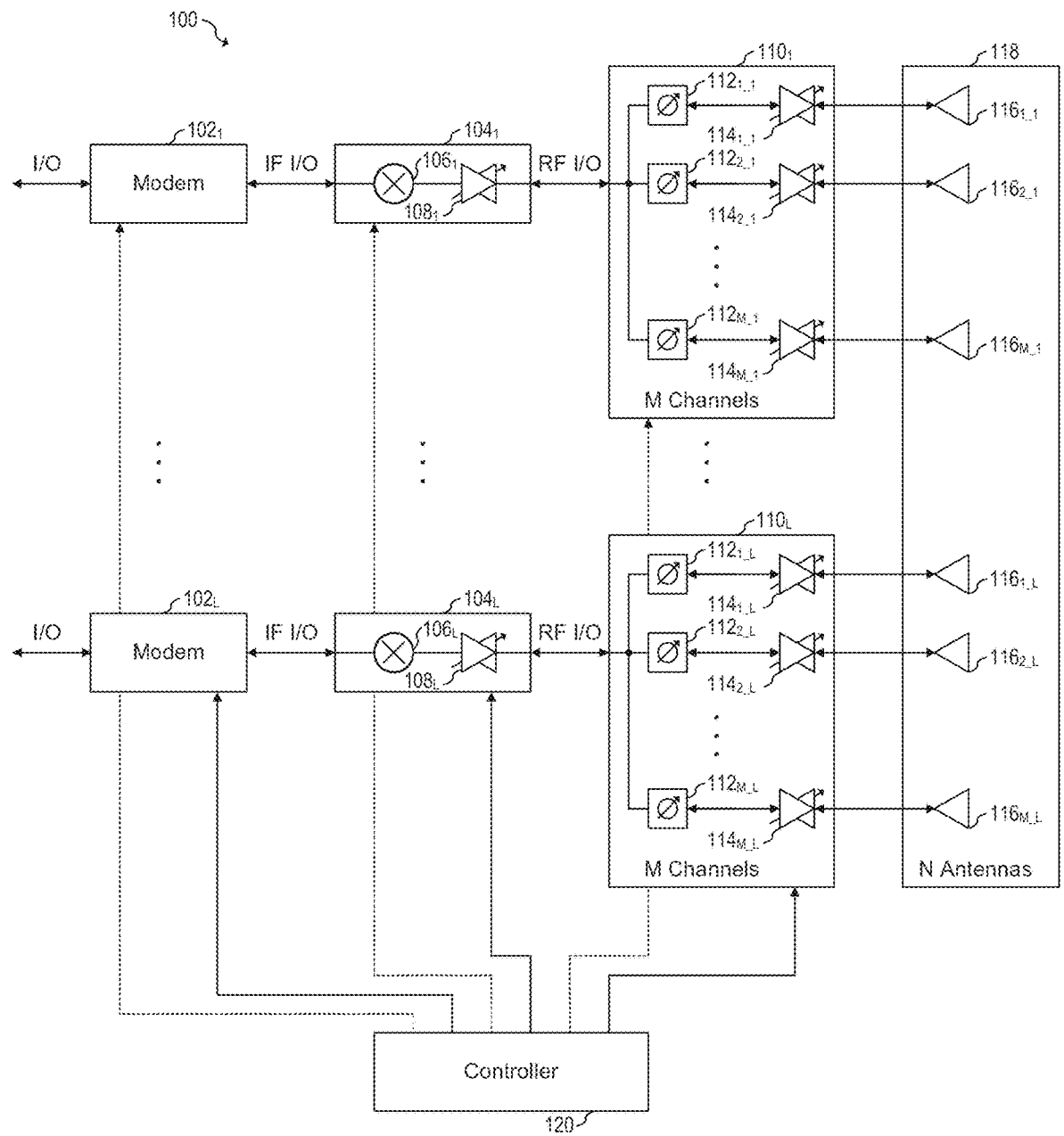
FIG. 1 shows a schematic diagram of a configurable millimeter-wave system, according to an embodiment of the present invention.

FIG. 1 shows a schematic diagram of configurable millimeter-wave system 100, according to an embodiment of the present invention. Millimeter-wave system 100 includes L modulators/demodulators (modems) 102, L frequency converters 104, L beamformer circuits no, where each beamformer circuit no includes M beamforming channels, and feeds N antennas 116, where L may be 1 or more, M may be 1 or more, and N may be L times M. Millimeter-wave system 100 may operate as a 5G communication systems for transmitting and/or receiving information, and/or as a radar system. As shown in FIG. 1, modems 102, frequency converters 104, and beamformer circuits no are bidirectional circuits (e.g., I/O stands for input/output).

During normal operation as a 5G communication system, configurable millimeter-wave system 100 may transmit or receive information. For transmitting information, configurable millimeter-wave system 100 receives information to be transmitted via I/O terminals, e.g., from controller 120 or from another circuit or device. Modem(s) 102 modulates the information to be transmitted to generate intermediate frequency (IF) signal(s). The IF signal(s) are up-converted to RF signal(s) in the millimeter-wave range using frequency converter(s) 104. The RF signal(s) are then fed through beamformer circuit(s) no and transmitted through antenna(s) 116.

In some embodiments, the information to be transmitted received via I/O terminals is digital. In such embodiments, the baseband to IF conversion may be done digitally and a digital-to-analog converter (DAC) may be used to generate the IF signals(s). In other embodiments, the information to be transmitted received via I/O terminals is analog. In such embodiments, the analog baseband signals are modulated by modem 102 using a quadrature (IQ) modulator/demodulator.

For receiving information, configurable millimeter-wave system 100 receives RF signal(s) via antenna(s) 116 and beamformer circuit(s) 110. The received RF signal(s) are down-converted to IF signal(s) using frequency converter(s) 104. The IF signal(s) are then demodulated using modem(s) 102 and sent, e.g., to controller 120 or to another circuit or device for further communication processing.

In some embodiments, the further communication processing includes unpacking packets (e.g., extracting information from one or more communication frames), processing control frames, determining communication link quality and strength, and other known communication processing. In some embodiments, communication processing also includes determining a location of a user-equipment (UE) using known techniques, such as by using, e.g., power strength (usually called received signal strength or RSS), time of flight (ToF), and angle of arrival (AoA). In some embodiments communication processing also includes hand-off of the communication link from beam to beam and from base stations to base stations, e.g., as the UE moves, in ways known in the art. In some embodiments, configurable millimeter-wave system 100 may adjust beamformer circuit(s) no, e.g., to modify the shape and direction of the beams, e.g., based on information received via the received packets.

When operating as a communication system, configurable millimeter-wave system 100 may transmit and receive packets, e.g., according to 5G standards or pre-standards, such as the 5G standard release 15 (5G NR standard), 5GTF, and 5G-SIG, and future releases, such as 5G standard release 16, scheduled for December 2019. A person skilled in the art would recognize that the teachings disclosed herein are also applicable to millimeter-wave communication protocols other than the standards and pre-standards explicitly mentioned in this disclosure.

During normal operation as a radar system, configurable millimeter-wave system 100 modulates radar waveforms, such as linear frequency modulated chirps (e.g., from controller 120 or another circuit or device) to operate, e.g., as an FMCW radar, using modem(s) 102 to generate intermediate frequency (IF) signal(s). The IF signal(s) are up-converted to RF signal(s) in the millimeter-wave range using frequency converter(s) 104. The RF signal(s) are then fed through beamformer circuit(s) no and transmitted through antenna(s) 116 via one or more beams.

The RF signals transmitted by antennas(s) 116 during radar operation are reflected by objects in the field of view of the one or more beams and received by antenna(s) 116 and beamformer circuit(s) no. The received RF signal(s) are down-converted to IF signal(s) using frequency converter(s) 104. The IF signal(s) are then demodulated using modem(s) 102 and sent, e.g., to controller 120 or another circuit or device for further radar processing.

In some embodiments, the further radar processing includes performing range FFT, determining angle of arrival using, e.g., the mono-pulse algorithm, identifying static and moving objects in the field of view of the one or more beams, determining the velocity of the moving objects, detecting gestures of detected objects, tracking the identified static or moving objects, performing radar imaging, and other known radar processing.

In some embodiments, the same antenna that is used for transmitting the radar waveforms is used to receive the reflected radar waveforms. In other embodiments, different antennas are used for transmitting and receiving radar waveforms via different RF/IF paths.

Each modem 102 includes a modulator circuit for modulating baseband signals into IF signals and a demodulator circuit for demodulating IF signals into baseband signals. The modulator and demodulator circuits may be implemented in any way known in the art. The implementation may be different depending on whether the signals flowing through I/O terminals are digital or analog. In some embodiments, the modulation circuit may include a DAC, digital and/or analog filters, and a digital signal processing (DSP) engine. The demodulator may include an analog-to-digital converter (ADC), digital and/or analog filters, and a digital signal processing (DSP) engine. In some embodiments, the same DSP engine may be used for the modulator circuit and for the demodulator circuit. The DSP engine may be implemented in modem 102 or in controller 120, for example. Some embodiments may implement the DSP engine independently from controller 120 and modem 102.

Modem 102 may use any known modulation/demodulation methods and techniques, such as orthogonal frequency-division multiplexing (OFDM), phase-shift keying (PSK), quadrature amplitude modulation (QAM), amplitude PSK (APSK), amplitude-shift keying (ASK), frequency-shift keying (FSK) and frequency modulated continuous waveform (FMCW) for radar. In some embodiments, controller 120 may dynamically change the particular modulation/demodulation scheme used. For example, the modulation scheme used for radar operations may be different than the modulation scheme used for communication operations.

Each frequency converter 104 includes mixer circuit 106 and variable gain amplifier (VGA) 108 connected in a chain. In some embodiments, each frequency converter 104 includes a chain of a plurality of mixer circuits 106 and a plurality of VGAs 108 (e.g., connected in series).

In transmit mode (for either communication or radar operations), mixer circuit 106 mixes the input IF signal with a reference signal and VGA 108 then amplifies the mixed signal to generate an output RF signal. In receive mode (for either communication or radar operations), VGA 108 amplifies input RF signal and mixer circuit 106 mixes the amplified RF signal with a reference signal to generate an output IF signal. In some embodiments, the reference signals used for transmit and for receive may be different. In some embodiments, controller 120 may dynamically change the frequency of the reference signal(s). For example, the frequency of the reference signal used for radar operations may be different (e.g., higher or lower) than the frequency of the reference signal used for communication operations.

In some embodiments, the IF signals may be, for example, in the 3 GHz to 9 GHz frequency range while the RF signals may be in the mmWave range, such as between 24.25 GHz and 52.6 GHz. Other frequencies in other frequency ranges may also be used.

As shown in FIG. 1, mixer circuit 106 and VGA 108 are bidirectional circuits. Mixer circuit 106 and VGA 108 may be implemented in any way known in the art. For example, VGA 108 may be implemented as two separate VGAs (e.g., a transmit VGA and a receive VGA). The amplification gain of VGA 108 may be dynamically adjusted, e.g., by controller 120. The amplification gain of VGA 108 may be higher than 1 (amplification) or lower than 1 (attenuation), e.g., to optimize the dynamic range while minimizing distortion.

Each beamformer circuit 110 includes M beamforming channels, where each beamforming channel includes phase-shifter circuit 112 and VGA 114. The beamforming function may be performed, for example, by analog control of channel power levels by controlling VGA 114, as well as by controlling the phase shifts of phase-shifter circuits 112, e.g., via corresponding register programming through a digital interface control, e.g., such as serial peripheral interface (SPI). In some embodiments, each beamformer circuit no has a corresponding and independent modem 102, where the beamforming function is performed partially by analog control of the channel power level via VGA 114 and phase-shifter 112, and partially by controlling phase shifts and levels among separate digital streams in digital domain in each modem 102. In some embodiments, the beamforming function is performed by analog control only during a first time, and by digital control only during a second time, and by a mixed analog/digital control during a third time. In some embodiments, a first beamformer (e.g., beamformer $110_1$) is controlled with only an analog control while a second beamformer (e.g., beamformer $100_L$ is controlled with only a digital control at the same time. Other implementations are also possible.

In some embodiments, the beam is fixed. In other words, no dynamic beamforming is performed. In such embodiments, dynamic beamforming capabilities may be omitted.

In transmit mode (for either communication or radar operations), controller 120 configures each of the M phase-shifter circuits 112 and VGAs 114 to direct a (transmit) beam towards a target direction using, e.g., analog beamforming. For communication operations, the beam may be pointed towards a direction that optimizes the communication quality (e.g., by maximizing signal strength). For radar operations, the beam may be directed towards a spatial location that is to be scanned for, e.g., moving or static objects.

In receive mode (for either communication or radar operations), controller 120 configures each of the M phase-shifter circuits 112 and VGAs 114 to direct a (receive) beam towards a target direction using, e.g., analog beamforming. For example, for communication operations, the beam may be pointed towards the direction of arrival (DoA) of the communication signal. For radar operations, the beam may be pointed towards the direction where objects are to be monitored. Controller 120 may also use beamforming configuration (e.g., the state of phase-shifter circuits 112 and VGAs 114 for determining radar parameters, such as angle of arrival (AoA) and ranging.

In some embodiments, controller 120 dynamically modifies the direction of the beam by dynamically adjusting the phase and amplitude of one or more of the M beamforming channels to optimize operation of millimeter-wave system 100. For example, communication operations may be optimized by dynamically adjusting the beam towards the UE (if millimeter-wave system 100 is implemented on a base station), or towards the base station (if millimeter-wave system 100 is implemented on a UE). For example, a narrower beam with higher gain may be used to extend the range of the beam. As another example, radar operations may be optimized by dynamically changing the shape and direction of the beam to monitor specific spatial regions around millimeter-wave system 100.

In some embodiments, the frequencies used for 5G communication are different than the frequencies used for radar operation. For example, in some embodiments, the frequencies used for radar operations are in a frequency range that is adjacent to the frequency range used for 5G communication. For example, in some embodiments, the frequency used for 5G communication are in the 5G communication bands n258 (from 24.25 GHz to 27.5 GHz) and the frequency used for radar operations is in an adjacent ISM band from 24 GHz to 24.25 GHz. In some embodiments, the frequency used for 5G communication are in near the upper end of the FR2 band (52.6 GHz), as outlined in 5G standard release 15, and the frequency used for radar operations is in an adjacent ISM band from 61 GHz to 61.5 GHz. Other frequency ranges may also be used, such as 5G communication frequencies in the E-band (60-90 GHz) and radar operation frequencies in the 61 GHz to 61.5 GHz range.

Millimeter-wave system 100 may be implemented with one or more antennas 116. In some embodiments, millimeter-wave system 100 includes dozens of antennas. In some embodiments, millimeter-wave system 100 may include over 100 antennas, such as 256 antennas or more, for example. Antennas 116 may be arranged, for example, in antenna array 118 of rows and columns in ways known in the art (the rows and columns are not shown in FIG. 1 for clarity purposes). For example, antennas 116 may be spaced apart by a first distance, where the first distance is based on the wavelength of the RF signal. In some embodiments, antenna array 118 includes a plurality of antenna sub-arrays, where each antenna sub-array corresponds to a modem 102.

In some embodiments, the first distance may be equal to or smaller than 0.6 times the wavelength of the RF signals used for 5G communication. Using adjacent frequency bands for 5G communication and radar operations advantageously allows for using the same antenna array for 5G communication and radar operation without substantially reducing radar or communication performance (since the first distance between antennas 116 may be small compared to the wavelength of the RF signal, e.g., smaller than 1 times the wavelength of the RF frequency used for either 5G communication or radar operations).

Controller 120 may configure one or more of circuits 102, 104 and no using wired or wireless protocols. For example, in some embodiments, controller 120 uses SPI to configure modems 102, frequency converters 104, and/or beamformer circuits 110, e.g., by writing corresponding registers. Other embodiments may use Inter-Integrated Circuit (I²C), universal asynchronous receiver-transmitter (UART) or other protocols. Other embodiments may use dedicated digital or analog signals for configuring one or more aspects of modems 102, frequency converters 104, and/or beamformer circuits 110.

Controller 120 may be implemented as a general purpose processor, controller or digital signal processor (DSP) that includes, for example, combinatorial circuits coupled to a memory. In some embodiments, the DSP may be implemented with an ARM or x86 architecture, for example. In some embodiments, controller 120 may be implemented as a custom application specific integrated circuit (ASIC). In some embodiments, controller 120 includes a plurality of processors, where each processor has one or more processing cores. In other embodiments, controller 120 includes a single processor having one or more processing cores. Other implementations are also possible. Some embodiments may implement controller 120 as a combination of hardware accelerator and software running on a DSP or general purpose micro-controller.

Millimeter-wave system 100 may be implemented in a monolithic semiconductor substrate in an integrated circuit (IC). In some embodiments, millimeter-wave system 100 may be implemented in a plurality of semiconductor substrates that are packaged in a single package or module of, e.g., several ICs. In other embodiments, millimeter-wave system 100 may be implemented in a plurality of packages. For example, in some embodiments, frequency converter(s) 104 are integrated in a first package, beamformer circuit(s) no are in a second package, and antenna(s) 116 are external to the first and second packages. In other embodiments, frequency converter(s) 104 and beamformer circuit(s) no are in a first package while antenna(s) 116 are external to the first package. Controller 120 may be implemented in a package separate from frequency converter(s) 104, beamformer circuit(s) no, and antenna(s) 116. In some embodiments, modem(s) 102 is implemented together with controller 120 in the same package. In other embodiments, modem(s) 102 are implemented separately from controller 120. Other implementations are also possible.

In some embodiments, millimeter-wave system 100 may be implemented with L RFICs, where L is the number of modems 102, and where each RFIC includes a modem circuit 102, a frequency converter 104, a beamformer circuit no having M channels, and M antennas 116 arranged in an array of rows and columns, and where each RFIC is packaged in a single package. In other embodiments, millimeter-wave system 100 may be implemented with N RFICs, where each RFIC includes one phase-shifter 112 (e.g., a single phase-shifter 112), one VGA 114 (e.g., a single VGA 114), and one corresponding antenna 116 (e.g., a single antenna 116). In such embodiments, modem(s) 102 and frequency converter(s) 104 may be external to the RFICs. In some embodiments, the DAC and ADC are integrated in the same monolithic semiconductor substrate as modem 102 in the same IC. In some embodiments, each RFIC includes M channels. In some embodiments, each RFIC includes more than one phase-shifter 112 and/or more than one VGA 114. Other integration implementations are also possible.

Figure 2A:
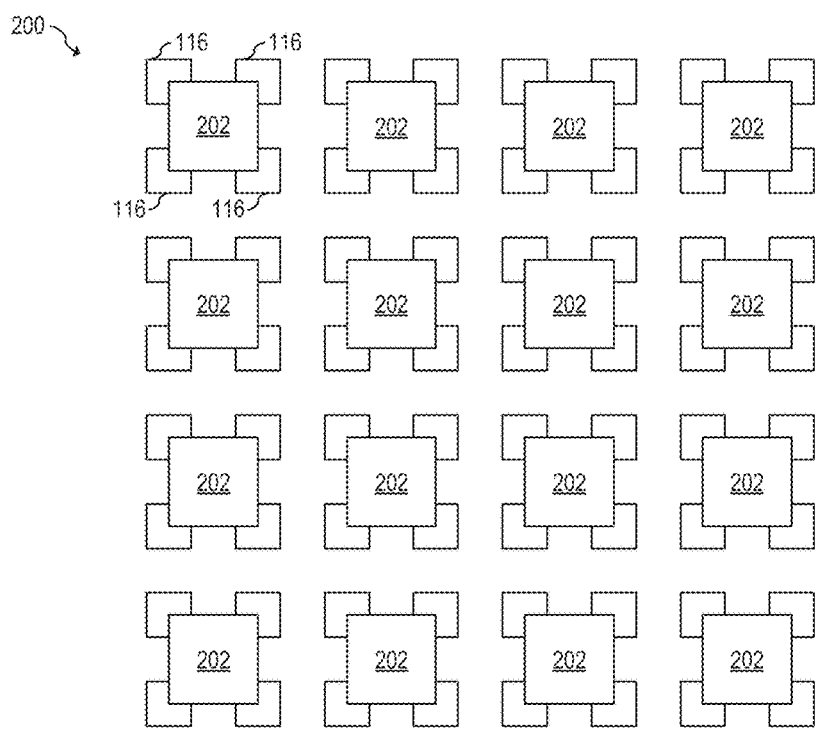
FIG. 2A shows an arrangement of RFICs of the millimeter-wave system of FIG. 1, according to an embodiment of the present invention.

FIG. 2A shows an arrangement of RFICs 202 of millimeter-wave system 200, according to an embodiment of the present invention. Millimeter-wave system 200 is a possible implementation of millimeter-wave system 100 that includes 16 RFICs 202, where each RFIC 202 includes a phase-shifter 112, a VGA 114, and a corresponding antenna 116. The arrangement of RFICs 202 shown in FIG. 2A may be implemented in a printed circuit board (PCB). In some embodiments, the arrangement of RFICs 202 shown in FIG. 2A may be packaged in a module. Although millimeter-wave system 200 is shown in FIG. 2 to include only 16 RFICs, a different number of RFICs, such as 4, 8, or 32 RFICs may be included in millimeter-wave system 200.

As shown in FIG. 2A, each RFIC 202 controls 4 antennas 116. In some embodiments, each RFIC 202 may control a different number of antennas, such as 1, 2, 8, 16, or 32, for example.

As shown in FIG. 2A, each RFIC 202 is coupled to at least one antenna 116. In some embodiments, the RFIC 202 may include one or more antennas 116.

During normal operation, each RFIC 202 may be configured individually to operate as a radar or as a communication device. Groups of RFIC 202 may be configured to cooperate to operate as a radar and/or as a communication device. For example, FIGS. 2B and 2C show millimeter-wave system 200 operating simultaneously as a radar device and as a communication device, according to an embodiment of the present invention.

Figure 2B:
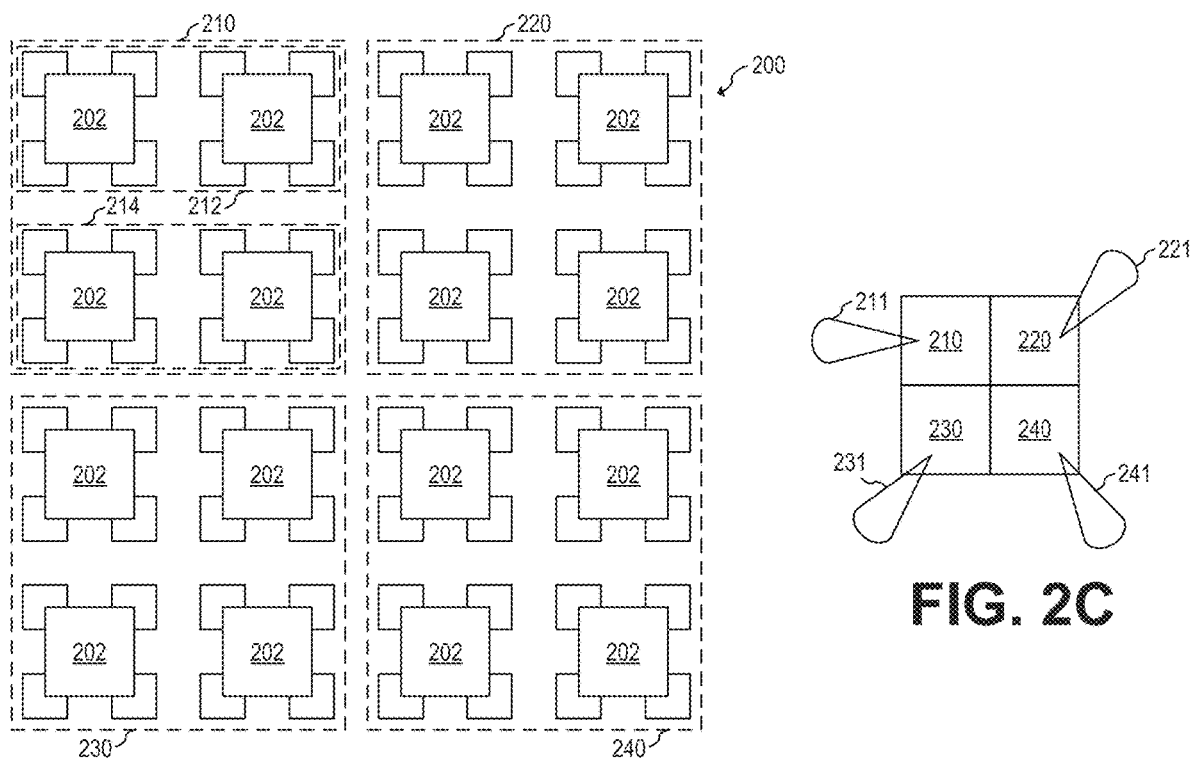
FIGS. 2B, 2C, 2D, and 2E show the millimeter-wave system of FIG. 2A operating simultaneously as a radar device and as a communication device, according embodiments of the present invention.

As shown in FIG. 2B, millimeter-wave system 200 is partitioned into four groups of RFICs 202, namely groups 210, 220, 230 and 240. Group 210 of RFICs 202 is configured to operate as a radar device where sub-groups 212 and 214 operate as radar transmitter and radar receiver, respectively. Groups 220, 230, and 240 are configured to operate as a communication device. In some embodiments, group 210 operates in an ISM RF band while groups 220, 230 and 240 operate in a 5G RF band. Performing the radar functions in an adjacent ISM band advantageously introduces a separation in frequency that allows for radar and communication functions to be performed simultaneously without substantial deteriorating performance of the radar or of the communication operations that may be caused by interference between radar and communication radiation.

Figure 2C:
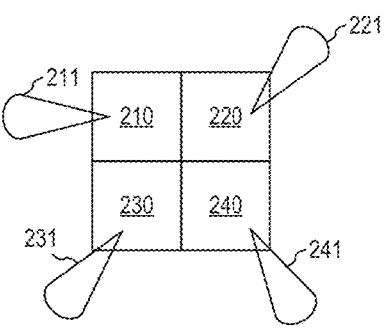

As shown in FIG. 2C, some embodiments may direct respective beams 211, 221, 231, and 241, of respective groups 210, 220, 230, and 240 in different directions to introduce spatial separation to allow for radar and communication functions to be performed simultaneously without substantial deteriorating performance of the radar or of the communication operations that may be caused by interference between radar and communication radiation. As described herein, some embodiments may direct radar beams and communication beams to the same or similar directions without substantial deteriorating performance of the radar or of the communication operations by operating with frequency separation and/or time separation.

Figure 2D:
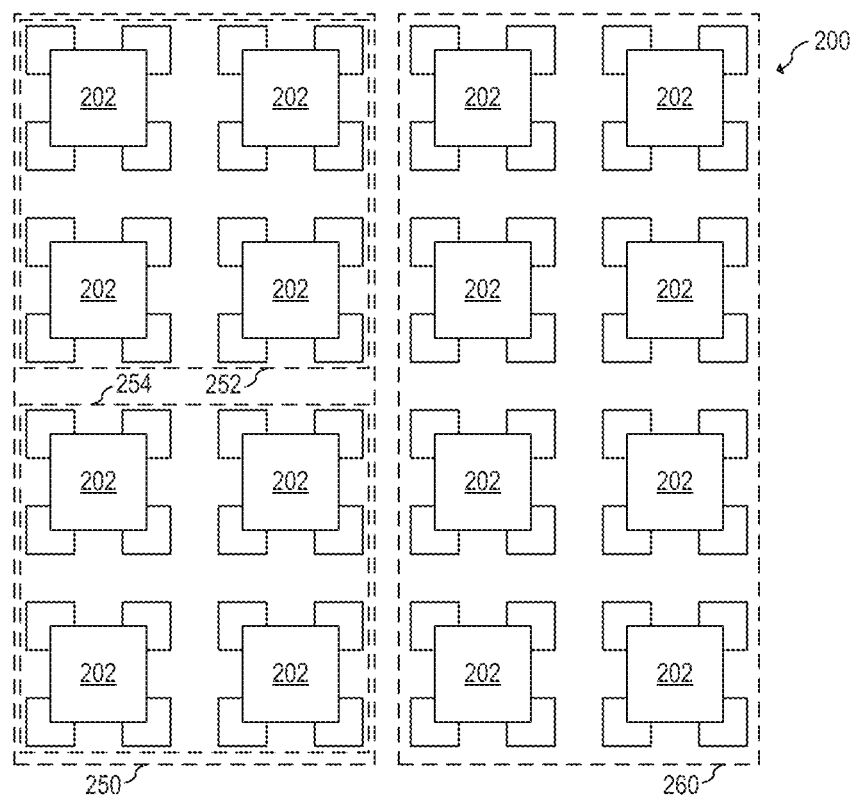
Figure 2E:
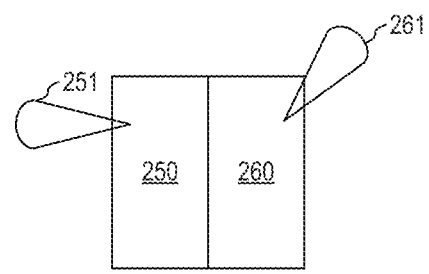

It is understood that millimeter-wave system 200 may be partitioned in different ways to perform simultaneous radar and communication operations. For example, some embodiments, may operate groups 210, 220, and 230 as a radar device while operating group 240 as a communication device. Other embodiments may operate groups 210 and 230 as a radar device while operating groups 220 and 240 as a communication device. Some embodiments may alternate between configurations. Some embodiments may have one or more groups inactive (either temporarily or permanently). Other implementations are also possible. For example, FIGS. 2D and 2E show millimeter-wave system 200 operating simultaneously as a radar device and as a communication device, according to an embodiment of the present invention. As shown in FIGS. 2D and 2E, millimeter-wave system 200 is partitioned into two groups of RFICs 202, namely groups 250 and 260. Group 250 of RFICs 202 is configured to operate as a radar device where sub-groups 252 and 254 operate as radar transmitter and radar receiver, respectively.

Figure 2F:
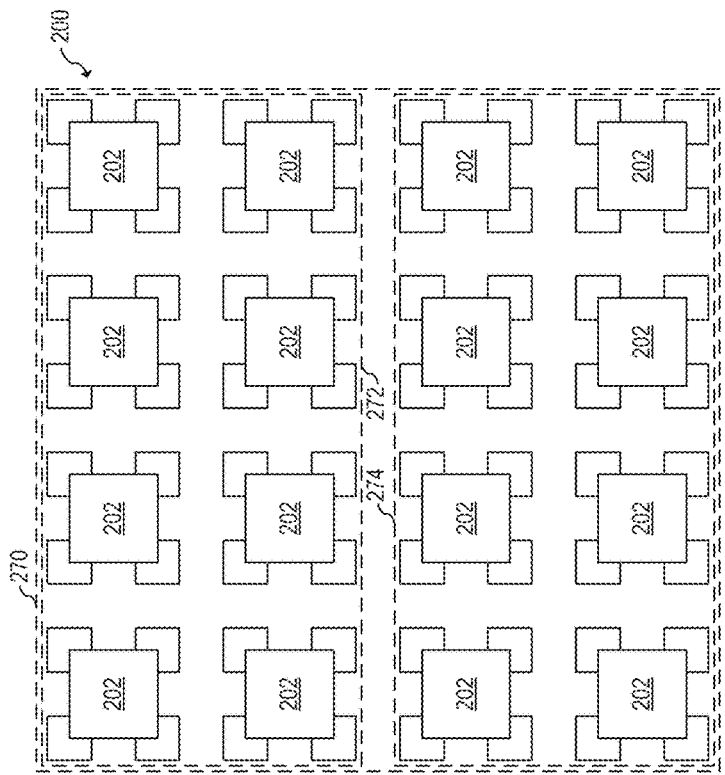
FIGS. 2F and 2G shows the millimeter-wave system of FIG. 2A operating sequentially as a radar device and as a communication device, according to an embodiment of the present invention.
Figure 2G:
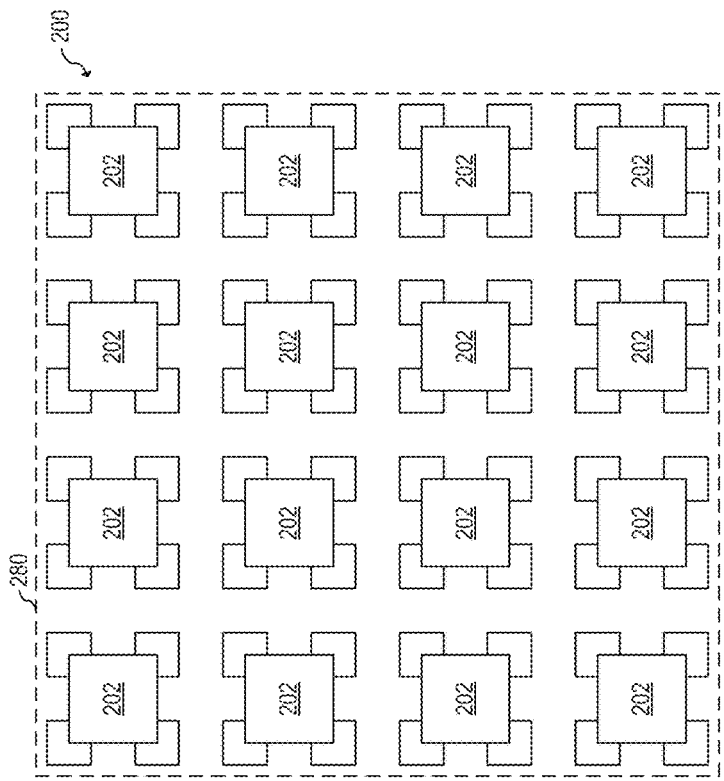
Figure 2G:
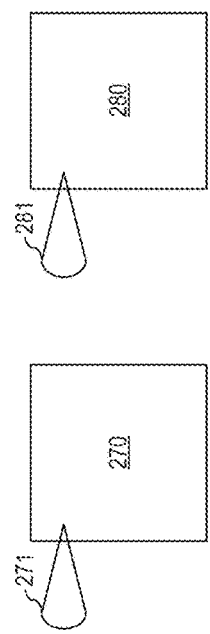

In some embodiments, millimeter-wave system 200 may operate with a separation in time, which advantageously allows for radar and communication functions to be performed sequentially, which may advantageously facilitate resources scheduling and may avoid substantial deteriorating performance of the radar or of the communication operations that may be caused by interference between radar and communication radiation. For example, FIGS. 2F and 2G shows millimeter-wave system 200 operating sequentially as a radar device and as a communication device, according to an embodiment of the present invention. As shown in FIGS. 2F and 2G, millimeter-wave system 200 is partitioned into a single group of RFICs 202 that operates sequentially as a radar device (group 270) having sub-groups 272 and 274 operating as radar transmitter and radar receiver, respectively, and as a communication device (group 280).

Although FIGS. 2A-2G show a millimeter-wave system having 16 RFICs that may be grouped in one, two or four groups, and operate with frequency separation, and/or spatial separation, and/or time separation, a different number of RFICs and/or a different number of groups and/or sub-groups may be used. In some embodiments, millimeter-wave system 200 may be dynamically reconfigured (e.g., by controller 120) to operate at a first time in a manner as described in FIGS. 2B and 2C, at a second time in a manner as described in FIGS. 2C and 2D, and at a third time in a manner as described in FIGS. 2E and 2F. Other modifications are also possible.

In some embodiments, each of the RFICs may be coupled or include more than one antenna 116. It is understood that although FIGS. 2A-2G shows a millimeter-wave system with 16 packaged RFICs 202, it is possible to implement millimeter-wave system with a different packaging arrangement (e.g., a single IC, or a different partition of IC's).

Advantages of some embodiments include the integration of radar functions and communication functions into the same tunable hardware. Integrating radar and communication functions into the same, e.g., single tunable RF front end advantageously allows, e.g., for sensing and detecting moving and/or static objects using radar functions of the millimeter-wave system and transmitting the object detection information using the communication function of the same millimeter-wave system. Some embodiments advantageously continuously transmit the radar information obtained with the millimeter-wave system using communication operations of the same millimeter-wave system.

Integrating radar and communication operations into a single millimeter-wave system advantageously allows for implementation of radar and communication systems in small areas, such as that of a drone, mobile phone, wearable and other devices.

Operating with frequency separation advantageously allows for simultaneous and/or sequential radar and communication operations. In some embodiments, the millimeter-wave system advantageously operates as a radar device without monitoring whether the communication channel is free.

Additional imaging of environment (including, e.g., time-of-flight data or other ranging radar processing coming from the millimeter-wave system operating as a radar device) may be combined with location information derived from the communication streams, e.g., to enhance the determination of DoA of targets, such as UEs, and estimate and define their positions. Thus, in some embodiments, fusion of channel information from the communication link, and ranging information from radar operations advantageously provide precise localization of, e.g., a UE. Such precise information may be used to enhance communication operations (e.g., increase communication quality by, e.g., optimizing beam shape and direction) and/or radar operations (e.g., by improving object location for object tracking and for optimizing beam shape and direction for improved spatial resolution).

Additional advantages of some embodiments include scalability of the architecture. For example, a millimeter-wave system may use the same overall architecture, such as shown in FIG. 2A, but use more RFICs 202, such as 32 or 100 or more, or less RFICs 202 such as 8 or 4 based on the particular needs of a system.

Figure 3A:
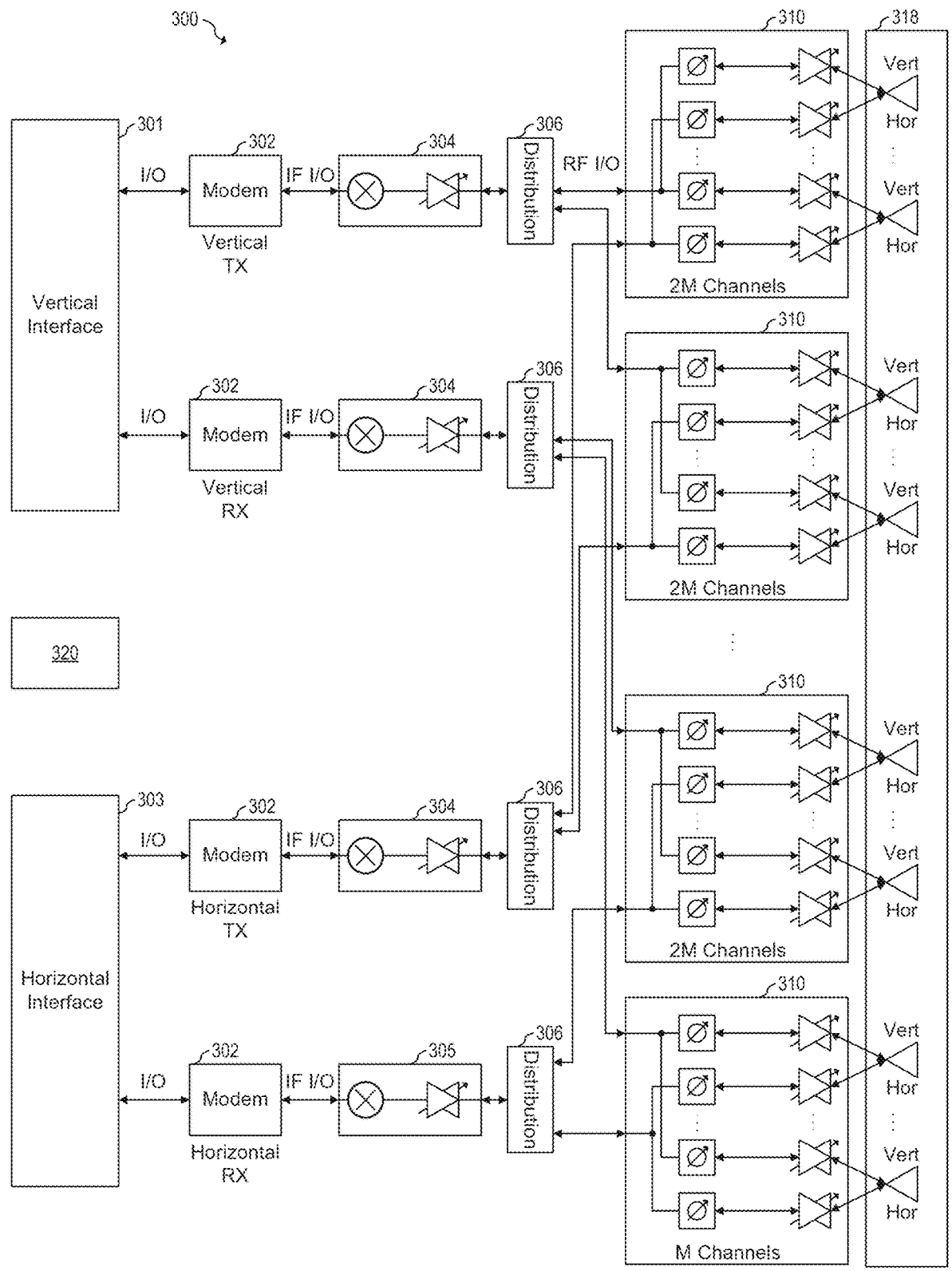
FIG. 3A shows a schematic diagram of a millimeter-wave system, according to an embodiment of the present invention.

FIG. 3A shows a schematic diagram of millimeter-wave system 300, according to an embodiment of the present invention. Millimeter-wave system 300 includes vertical polarization interface 301, horizontal polarization interface 303, a plurality of modems 302, a plurality of frequency converters 304, distribution networks 306, a plurality of beamformer circuits 310, antenna array 318, and controller 320 (connection to and from controller 320 have been omitted from FIG. 3A for clarity purposes). Millimeter-wave system 300 may be implemented with a plurality of RFICs 202, e.g., as shown in FIG. 2A.

FIG. 3A identifies specific paths to be used as receiver (RX) or transmitter (TX) (e.g., Vertical TX, Vertical RX, Horizontal TX, and Horizontal RX) for clarity purposes. However, it is understood that each path may be used for either TX or RX at different times. For example, when operating in communication mode, any path may operate as RX or TX. Similarly, when operating in radar mode, any path may operates as RX or TX.

Some embodiments may not implement distribution network 306. In such embodiments, each RF I/O terminal of each beamformer circuit 310 can have an individual chain feeding it in an implementation similar to the implementation shown in FIG. 1 (but with double amount of feeding channels).

Millimeter-wave system 300 operates in a manner similar to millimeter-wave system 100, with modems 302, frequency converters 304, beamformer circuits 310, and controller 320 operating in a manner similar to modems 102, frequency converters 104, beamformer circuits no, and controller 320, respectively. Millimeter-wave system 300, however is implemented with a dual polarization architecture. Vertical and horizontal polarization interfaces 301 and 303 have independent signal paths feeding the same antenna, where the paths are isolated by polarization inside the antennas. Thus, each antenna of antenna array 318 operates with vertical and horizontal polarization and the beamformer circuits 310 have 2M channels, twice the amount of channels of a comparable single polarization implementation, such as shown in FIG. 1.

Millimeter-wave system 300 may be operated as described in FIGS. 2B-2G. Additionally, the dual polarization of millimeter-wave system 300 allows for additional modes of operation. For example, in some embodiments, one interface (e.g., 301) may be used for FMCW radar operations while the other interface (e.g., 303) may be used for 5G communication. It is understood that additional permutations of the dual polarization mode and the modes described with respect to FIGS. 2B-2G are also possible. For example, time separation may be used where vertical and horizontal polarization are used for FMCW radar operations at a first time and vertical and horizontal polarization are used for 5G communication at a second time. Millimeter-wave system 300 may also use a combination of spatial, frequency, and time separation.

In some embodiments, the time separation is based on: the waveform structure (e.g., the particular 5G NR waveform structure), the particular numerology used, availability of resources of millimeter-wave system 300, and/or the data demand in the network.

Figures 3B, 3C:
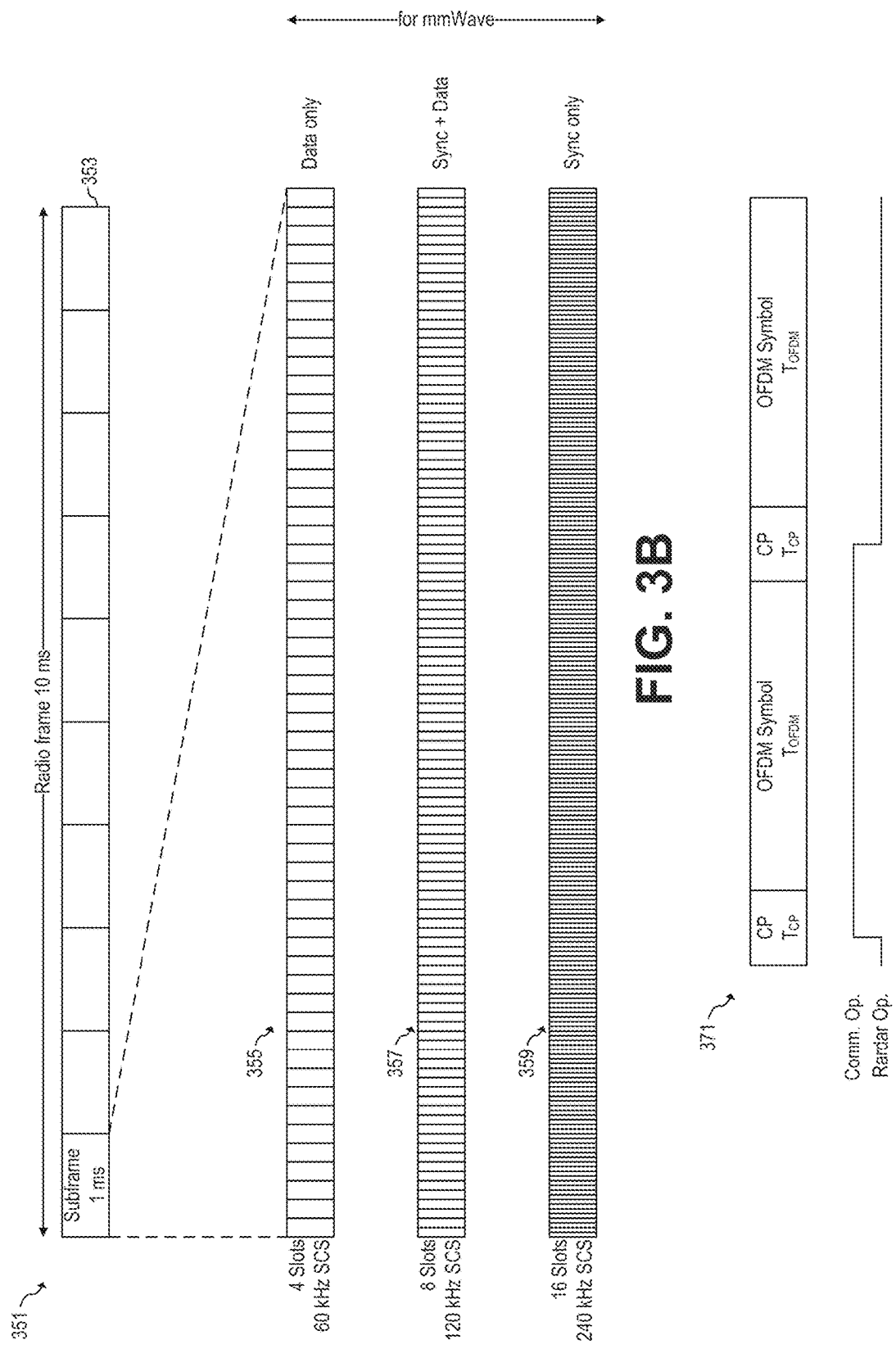
FIGS. 3B and 3C shows transitions between FMCW radar operations and 5G Communication operations, according to an embodiment of the present invention.

FIGS. 3B and 3C show transitions between FMCW radar operations and 5G Communication operations, according to an embodiment of the present invention. FIG. 3B shows a frame structure for 5G NR standard. As shown in FIG. 3B, one radio frame (e.g., frame 353) of 10 ms includes 10 sub-frames of 1 ms. Each sub-frame (e.g., 355, 357, or 359) includes a number of slots that include OFDM symbols (depicted as boxes inside each sub-frame).

The number of slots in each sub-frame depends on the chosen subcarrier spacing (SCS). For example, sub-frame 355 operates at 60 kHz SCS and has 4 slots. Sub-frame 357 operates at 120 kHz SCS and has 8 SCS. Sub-frame 359 operates at 240 kHz SCS and has 16 slots.

As shown in FIG. 3C, each OFDM symbol has a cycle prefix (CP). In some embodiments, millimeter-wave system 300 transitions between radar mode (as a radar device) and communication mode (as a communication device) during the cycle prefix time. For example, as shown in FIG. 3C, a partition of millimeter-wave system 300 may operate in communication mode during transmission of a first OFDM symbol, and may operate in radar mode during transmission of a subsequent OFDM symbol, where the transition between communication mode and radar mode occurs during the cycle prefix time of the subsequent OFDM symbol.

Figure 4:
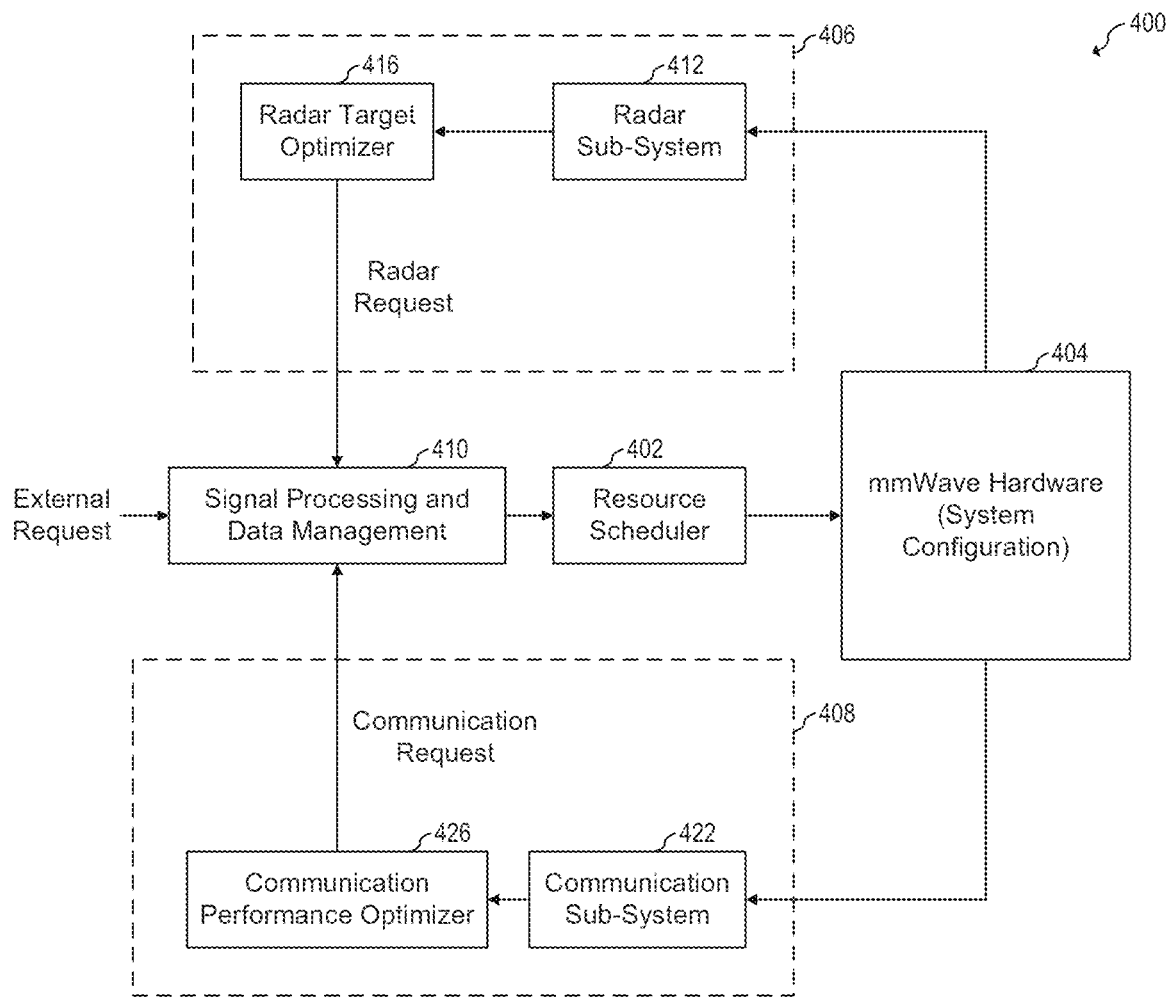
FIG. 4 shows a schematic diagram of a portion of the architecture of the controller of the millimeter-wave system of FIG. 3, according to an embodiment of the present invention.

Controller 320 may be used to dynamically reconfigure millimeter-wave system 300. For example, FIG. 4 shows a schematic diagram of a portion of the architecture of controller 320, according to an embodiment of the present invention. Controller 120 may also be implemented as shown in FIG. 4.

During normal operation, resource scheduler 402 dynamically configures millimeter-wave hardware 404 of millimeter-wave system 300 based on requests received from signal processing and data management module 410. Millimeter-wave hardware 404 includes vertical interface 301, horizontal interface 303, modems 302, frequency converters 304, distribution networks 306, and beamformer circuits 310. Configuring millimeter-wave hardware 404 may include one or more of determining whether just radar operations, just communication operations, or both are to be performed by millimeter-wave system 300, determining whether millimeter-wave system 300 operates with spatial separation, and/or frequency separation, and/or time separation, allocating groups and/or sub-groups of RFICs 202 and/or respective antenna polarization, to perform radar operations and/or communication operations, selecting the frequency of operation of each group and/or subgroup of RFICs 202, configuring beamformer circuits 310 to direct respective beams of each group and/or subgroup of RFICs 202 towards a determined direction, and at which times the radar operations and communication operations are to be performed.

Resource scheduler 402 may configure one or more aspects of millimeter-wave hardware 404 using SPI, I$^2$C, or other analog or digital wired or wireless communication protocol.

Once millimeter-wave system 300 is configured, radar processing module 406 and communication processing module 408 perform, respectively, radar and communication operations using the hardware of millimeter-wave system 300 according to the allocation of resource scheduler 402. Signal processing and data management module 410 receives information from radar processing module 406 and communication processing module 408 (and in some embodiments from an external device or system) and requests resource scheduler 402 to allocate resources for radar operations and/or communication operations based on the information received from radar processing module 406 and communication processing module 408. Resource scheduler 402 then either maintains the current allocation or changes the allocation of resources of millimeter-wave system 300 based on the request received from signal processing and data management module 410 by reconfiguring millimeter-wave hardware 404. The process of configuring millimeter-wave hardware 404, performing radar and communication operations, and reconfiguring millimeter-wave hardware 404 is repeated, e.g., while millimeter-wave system 300 is active.

Radar processing module 406 includes radar sub-system 412, and radar target optimizer module 416. Radar sub-system 412 performs radar operations, such as ranging, imaging, and/or target detection and the generation of a clutter map. Radar target optimizer determines radar parameter for optimized radar operation, such as spatial resolution, beam direction, bandwidth and/or other parameters based on the current state of millimeter-wave system 300, current requests to perform radar operation, and/or current state of the radar (e.g., location and direction of movement of tracked objects). Radar target optimizer module 416 then sends a request for hardware resources to signal processing and data management module 410.

Communication processing module 408 includes communication sub-system 422 and communication performance optimizer 426. Communication sub-system 422 performs communication operations, such as encoding and decoding data, determining current data-rate and bandwidth, determining communication channel quality, and other communication functions. Communication performance optimizer 426 determine communication parameter for optimized communication operations, such as estimating user data rate and bandwidth needs, determining beam direction for improved quality of communication channel, and/or other parameters based, e.g., on the current state of millimeter-wave system 300 and/or currents requests to perform communication operations. Communication processing module 408 416 then sends a request for hardware resources to signal processing and data management module 410.

Resource scheduler 402, radar processing module 406, communication processing module 408, and signal processing and data management 410 are implemented in controller 320, for example, by software instructions, e.g., stored in an associated (e.g., non-volatile) memory, and executed by a processing unit, by dedicated hardware, or a combination thereof.

Figure 5:
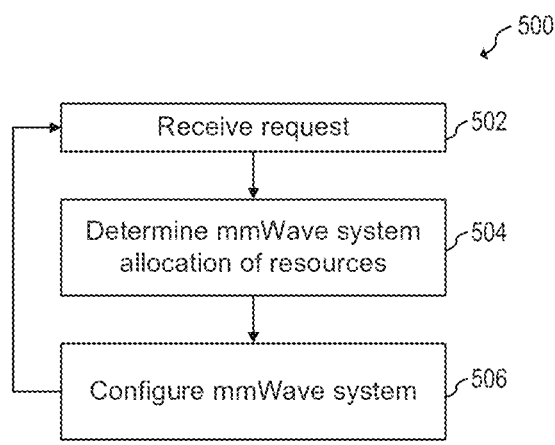
FIG. 5 illustrates an embodiment method of reconfiguring the millimeter-wave radar of FIG. 3A, according to an embodiment of the present invention.

FIG. 5 illustrates embodiment method 500 of reconfiguring millimeter-wave radar 300, according to an embodiment of the present invention. Method 500 may be implemented, for example, by controller 120 to dynamically reconfigure millimeter-wave system 300. Method 500 may also be implemented by other systems, such as by controller 120 to dynamically reconfigure millimeter-wave system 300, among others.

During step 502, millimeter-wave system 300 receives one or more requests for millimeter-wave system resources. The request for resources may be, for example, a request received by millimeter-wave system 300 via a 5G communication channel to identify objects in a particular location near millimeter-wave system 300. Other examples of requests include a request to increase the data rate for a 5G communication channel of millimeter-wave system 300, a request to send information via a 5G communication channel of millimeter-wave system 300 about location, and/or velocity, and/or tracking information of objects identified by radar operations of millimeter-wave system 300, and a request to increase spatial resolution for radar imaging generated by millimeter-wave system 300 based on current object tracking state.

During step 504, millimeter-wave system 300 determines how to group the RFICs 202 to perform the requested operations. For example, in some embodiments, millimeter-wave system 300 may allocate resources as illustrated in FIGS. 2B and 2C. Other resource allocations, such as using millimeter-wave system to perform only radar operations, or only to perform communication operations, or as illustrated in FIGS. 2D and 2E, FIGS. 2F and 2G, as well as with different antenna polarization configurations, or a combination thereof, are also possible. During step 506, millimeter-wave system 300 is configured as determined during step 504 and radar and/or communication operations are performed by millimeter-wave system 300. Then millimeter-wave system 300 receives requests for resources during step 502, repeating the sequence.

Figure 6:
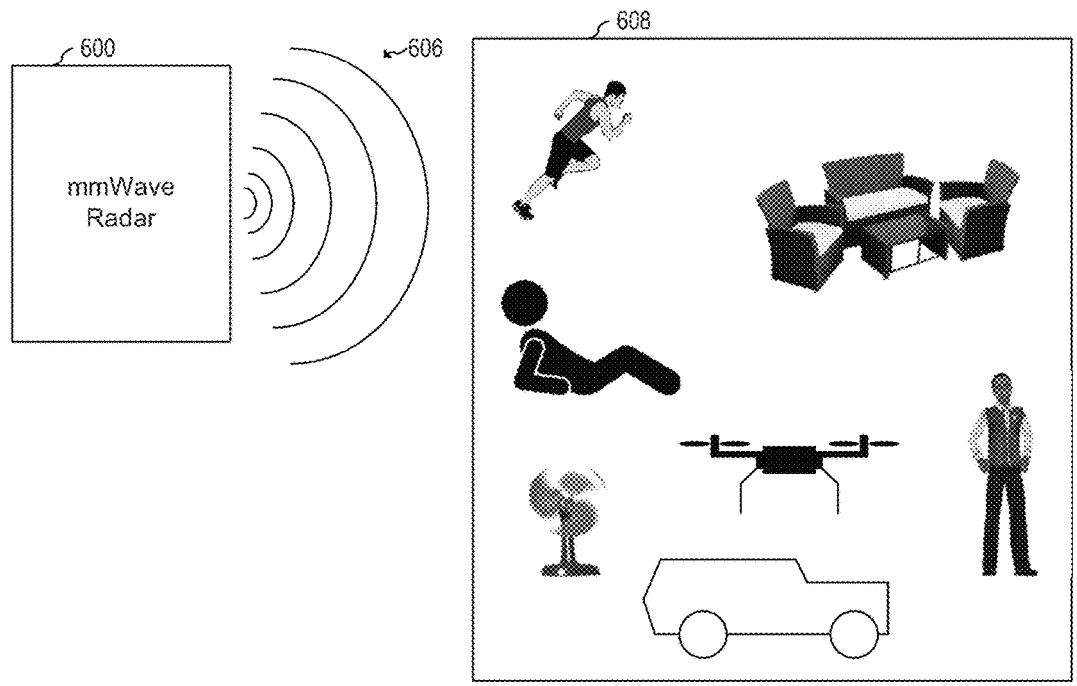
FIG. 6 shows the millimeter-wave system of FIG. 3A operating as a radar system, according to an embodiment of the present invention.

FIG. 6 shows millimeter-wave system 300 operating as a radar system, according to an embodiment of the present invention. Millimeter-wave system 300 during using one or more groups or sub-groups of RFICs 202, or by using all available hardware. The portion illustrated as millimeter-wave radar 600 in FIG. 6 is the hardware portion of millimeter-wave system 300 being used for radar purposes. It is understood that the hardware portion used for radar purposes may dynamically change, as explained, for example, with respect to FIGS. 2B-2G, and FIGS. 4 and 5.

During normal operation, millimeter-wave radar 600 transmits a plurality of radiation pulses 606, such as chirps, towards scene 608 using, e.g., a beam. In some embodiments, millimeter-wave radar 600 sends frames of equally spaced linear chirps, such as 256 equally spaced linear chirps. A different number of chirps, e.g., 16, 32, may also be used.

The transmitted radiation pulses 606 are reflected by objects in scene 608. The reflected radiation pulses (not shown in FIG. 6), which are also referred to as the echo signal, are detected and processed by millimeter-wave radar 600, for example, to determine the angle of arrival of the echo signal, location (i.e., range, azimuth and elevation components) of moving and/or static objects in the field-of-view (FoV) of the beam, velocity and/or direction of movement of objects in the FoV of the beam, identification of the type of objects detected (e.g., using micro-Doppler and/or macro-Doppler signatures), etc. To perform these and other radar functions, millimeter-wave radar 600 may perform one or more of Fast Fourier Transform (FFT) in slow time and/or in fast time, short-time Fast Fourier Transform (STFFT), Fractional Fourier Transform (FrFT), short-time fractional Fourier Transform (STFrFT), time-of-flight (ToF) calculations, and other radar processing techniques known in the art.

The objects in scene 608 may include static humans, such as a lying human, humans exhibiting low and infrequent motions, such as standing human, moving humans, such as a running or walking human, static or moving animals, such as dogs or cats, static or moving equipment, such as cars, drones, motorcycles, industrial equipment, furniture, periodically moving equipment, such as rotating fans, etc. Other objects may also be present in scene 608.

Millimeter-wave radar 600 operates as a FMCW radar that includes one or more transmitting antenna(s), and one or more receiving antenna(s). In some embodiments, the same antenna may be used for transmitting and receiving radar signals.

Millimeter-wave radar 600 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

Figure 7:
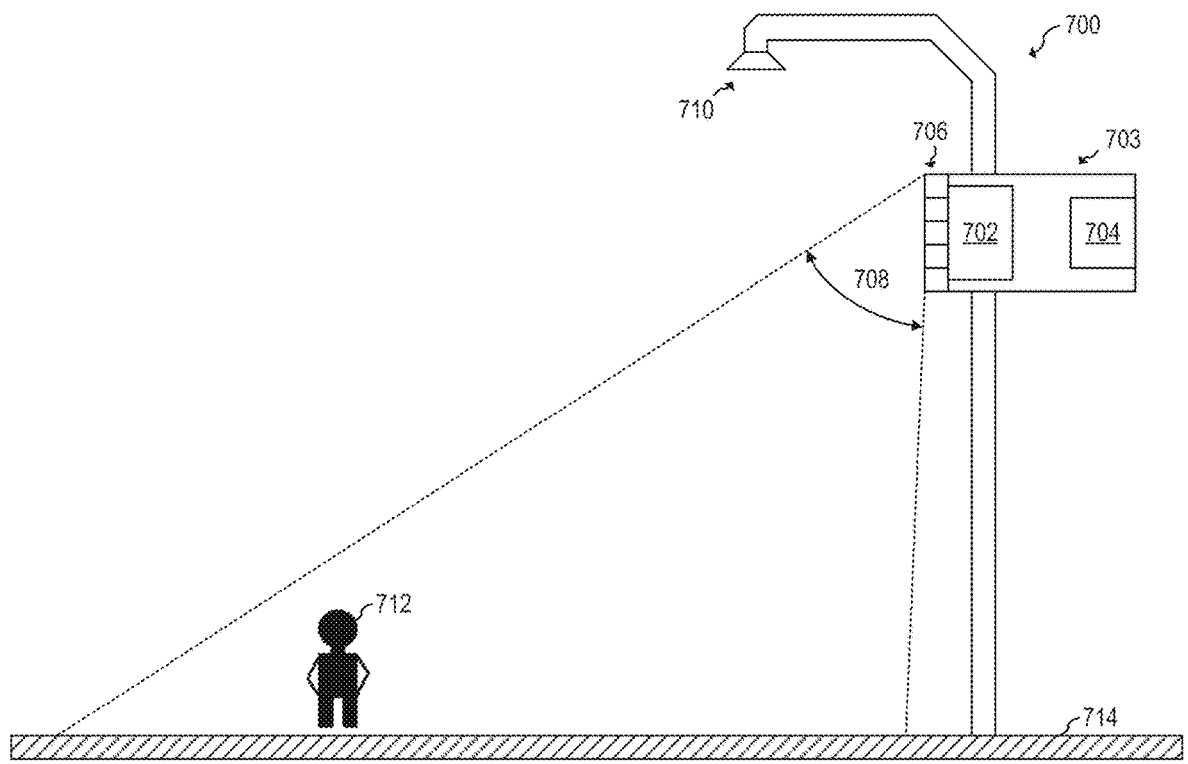
FIG. 7 shows a street level base station, according to an embodiment of the present invention.

FIG. 7 shows street level base station 700, according to an embodiment of the present invention. Street level base station 700 (e.g., a pico base station) includes street light 710 and millimeter-wave system 703. Millimeter-wave system 703 includes remote radio head (RRH) and radar module 704, combined front-end module 702, and antenna array 706. RRH and radar module 704, combined front-end module 702, and antenna array 706 are implemented with millimeter-wave system 703, which may be implemented, for example, with millimeter-wave system 100, 200, or 300.

For purposes of this description, it is assumed that millimeter-wave system 200 is used to implement millimeter-wave system 703.

During normal operation, resource scheduler 402 of millimeter-wave system 703 allocates resources for radar operation and for 5G communication operations. During radar operation, millimeter-wave system 703 directs radar beam 708 towards floor 714 and monitors for the presence of humans. When human 712 is detected in radar beam 708, millimeter-wave system 703 turns on street light 710. In some embodiments, the light brightness may be adjusted based on the proximity of human 712 to millimeter-wave system 703. By controlling light 710 based on the presence of humans, street level base station 700 advantageously saves power while maintaining the street illuminated when humans are present. It is understood that street level base station 700 may also be used to monitor other types of objects, such as cars, and bicycles.

In some embodiments, millimeter-wave system 703 may operate in a low-power consumption mode, e.g., where the communication link is inactive while performing radar operations. Upon detecting the presence of human 712, millimeter-wave system 703 wakes up (i.e., exits the low power consumption mode) and begins operating, e.g., as a smallcell/hot spot for 5G communication, advantageously creating a smart RF 5G communication coverage that saves power. In some embodiments, the location of human 712 detected using radar operations is used to direct the communication beam of millimeter-wave system 703 (not shown) towards the direction of human 712, advantageously improving communication quality while reducing beam-forming efforts at new user network entry.

In some embodiments, millimeter-wave system 703 may use radar operations (e.g., such as using three-dimensional imaging) for detecting objects that are not allowed within radar beam 708, such as a car in the sidewalk, for example. In some embodiments, millimeter-wave system 703 may report the presence of objects not allowed using 5G communication operations of millimeter-wave system 703. Thus, millimeter-wave system 703 may advantageously be used for surveillance applications, such as monitoring the presence of humans at times when humans are not allowed in such locations.

In some embodiments, radar beam 708 is fixed (e.g., not dynamically modified). In other embodiments, radar beam 708 is dynamically modified, e.g., to change direction or shape, e.g., to improve spatial resolution or monitor a different location at different times.

In some embodiments, millimeter-wave system 703 performs communication operations in a 5G RF communication band (e.g., the n258 band, operating from 24.25 GHz to 27.5 GHz) and performs radar operations in an ISM band adjacent to the RF communication band (e.g., an ISM ban from 24 GHz to 24.25 GHz). In some embodiments, millimeter-wave system 703 operates with additional time separation and/or spatial separation.

Figure 8B:
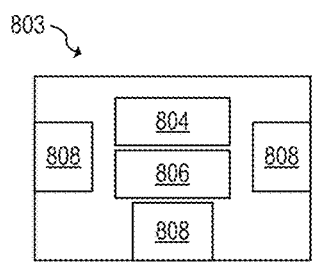
FIGS. 8A-8D show a drone system, according to an embodiment of the present invention.

FIGS. 8A-8D show autonomous drone system 800, according to an embodiment of the present invention. Autonomous drone system 800 includes one or more autonomous drones 802. Each autonomous drone 802 includes millimeter-wave system 803. As shown in FIG. 8B, millimeter-wave system 803 includes controller 804, radar module and communication module 806 and RF portions 808. Controller 804, radar module and communication module 806 and RF portions 808 are implemented with millimeter-wave system 803, which may be implemented, for example, with millimeter-wave system 100, 200, or 300. For purposes of this description, it is assumed that millimeter-wave system 200 is used to implement millimeter-wave system 803.

During normal operation, resource scheduler 402 of millimeter-wave system 803 allocates resources for radar operation and for 5G communication operations. During radar operation, millimeter-wave system 803 directs one or more radar beams, such as radar beams 810, 812, and 814 to autonomously detect the presence of objects, such as other flying drones, and for collision avoidance, as shown in FIG. 8A. The one or more radar beams may also be used to perform, e.g., height measurement to detect the altitude of autonomous drone 802 (e.g., using radar beam 812). Autonomous drone 802, thus, is advantageously capable of autonomously flying without colliding with objects, e.g., towards a predetermined location.

As shown in FIG. 8B, RF portions 808 of millimeter-wave system 803 may be located in different locations of autonomous drone 802 to facilitate beam formation. Some embodiments may integrate one or more of controller 804, radar module and communication module 806 and RF portions 808 in different ways.

In some embodiments, one or more radar beam (e.g., 810, 812, and 814) is/are fixed (e.g., not dynamically modified). In some embodiments, one or more radar beam (e.g., 810, 812, and 814) is/are dynamically modified, e.g., to change direction or shape, e.g., to improve spatial resolution or monitor a different location at different times.

In some embodiments, millimeter-wave system 803 performs communication operations in a 5G RF communication band and performs radar operations in an ISM band adjacent to the RF communication band. In some embodiments, millimeter-wave system 803 operates with additional time separation and/or spatial separation.

Figure 8C:
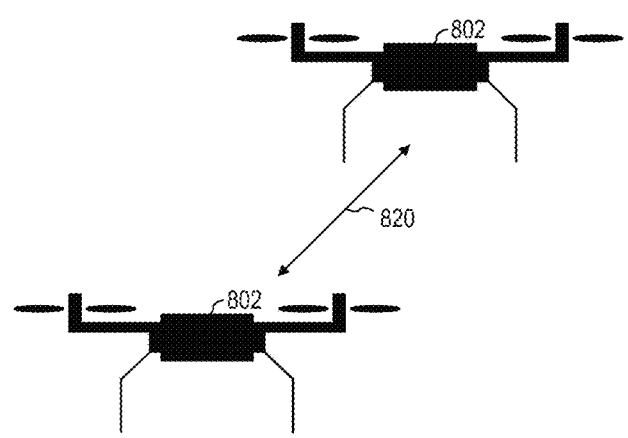
Figure 8A:
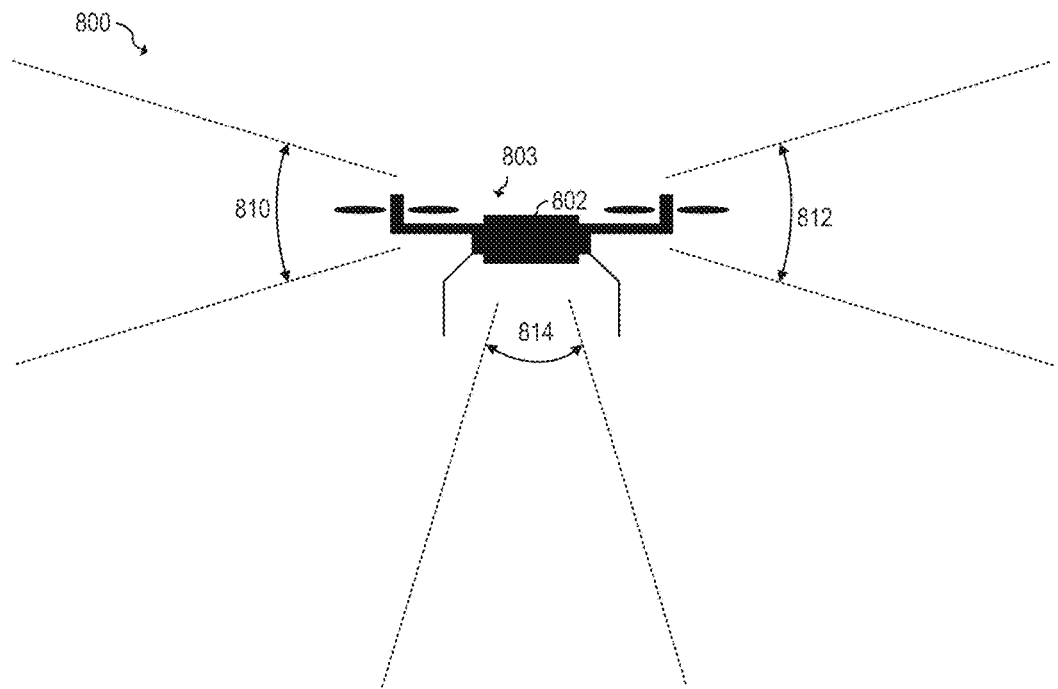
Figure 8D:
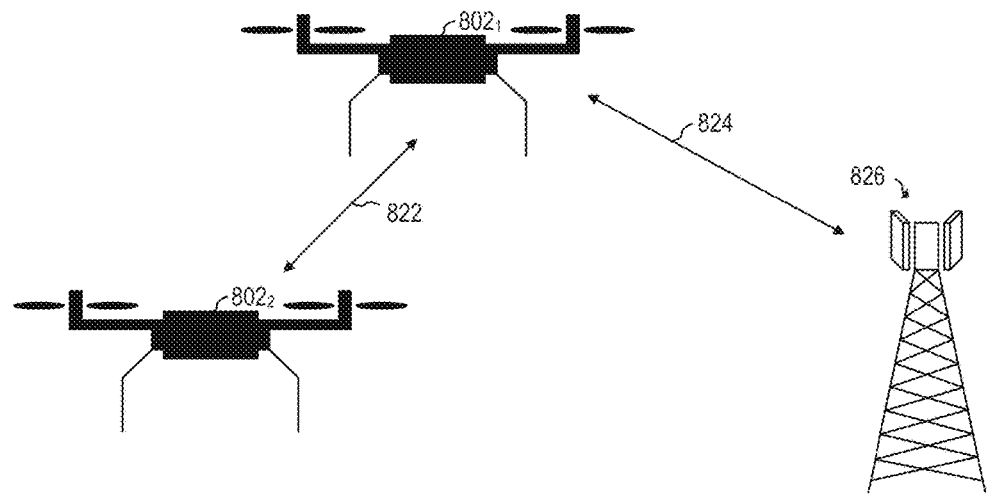

Each autonomous drone 802 may communicate to other autonomous drones 802 using communication operations of millimeter-wave system 803, as shown in FIG. 8C by communication link 820. As another example, in some embodiments, a first autonomous drone $802_1$ may serve as a communication relay between a second autonomous drone $802_2$ and base station 826 by using communication links 822 and 824. When functioning as a communication relay, an autonomous drone 802 advantageously forwards control data to neighboring drones that may not have access to directly communicate with base station 826.

Figure 9A:
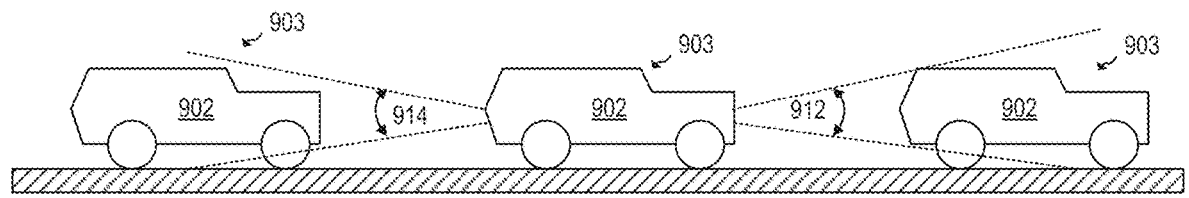
FIGS. 9A-9C show an autonomous vehicle system, according to an embodiment of the present invention.
Figure 9B:
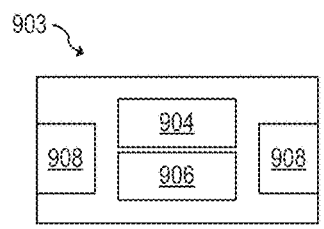
Figure 9C:
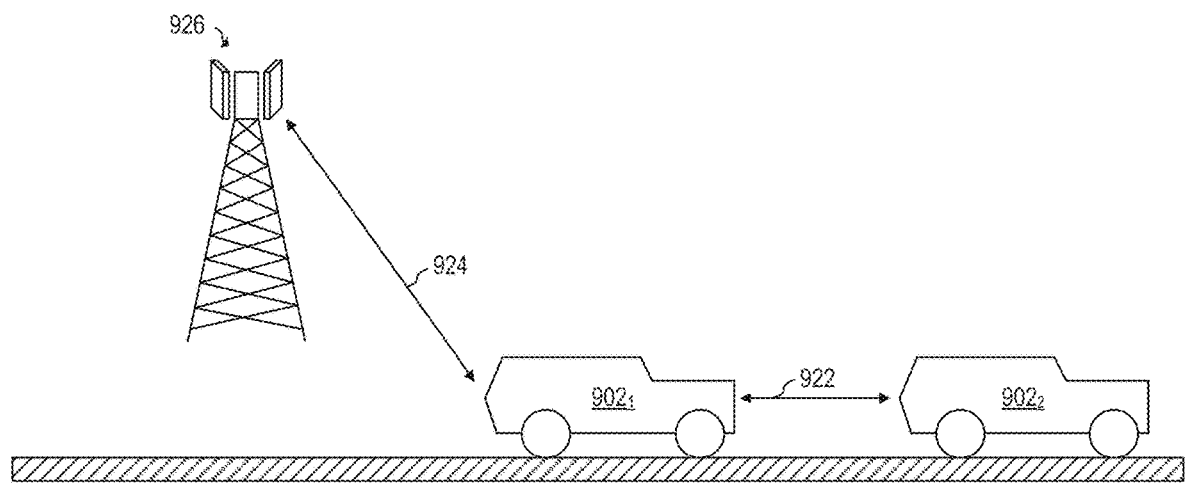

FIGS. 9A-9C show autonomous vehicle system 900, according to an embodiment of the present invention. Autonomous vehicle system 900 includes one or more autonomous vehicles 902. In some embodiments, the autonomous vehicle comprises a car or truck. Other vehicles may also be used, such as agricultural and construction site operations vehicles, for example.

Each autonomous vehicle 902 includes millimeter-wave system 903. As shown in FIG. 9B, millimeter-wave system 903 includes controller 904, radar module and communication module 906 and RF portions 908. Controller 904, radar module and communication module 906 and RF portions 908 are implemented with millimeter-wave system 903, which may be implemented, for example, with millimeter-wave system 100, 200, or 300. For purposes of this description, it is assumed that millimeter-wave system 200 is used to implement millimeter-wave system 903.

During normal operation, resource scheduler 402 of millimeter-wave system 903 allocates resources for radar operation and for 5G communication operations. During radar operation, millimeter-wave system 903 directs one or more radar beams, such as radar beams 912, and 914 to autonomously detect the presence of objects, such as other vehicles, and for collision avoidance, as shown in FIG. 9A. Autonomous vehicle 902, thus, is advantageously capable of autonomously driving without colliding with objects, e.g., towards a predetermined location.

As shown in FIG. 9B, RF portions 908 of millimeter-wave system 903 may be located in different locations of autonomous vehicle 902 to facilitate beam formation. Some embodiments may integrate one or more of controller 904, radar module and communication module 906 and RF portions 908 in different ways.

In some embodiments, one or more radar beam (e.g., 912, and 914) is/are fixed (e.g., not dynamically modified). In some embodiments, one or more radar beam (e.g., 912, and 914) is/are dynamically modified, e.g., to change direction or shape, e.g., to improve spatial resolution or monitor a different location at different times.

In some embodiments, millimeter-wave system 903 performs communication operations in a 5G RF communication band and performs radar operations in an ISM band adjacent to the RF communication band. In some embodiments, millimeter-wave system 903 operates with additional time separation and/or spatial separation.

Each autonomous vehicle 902 may communicate to other autonomous vehicles 902 using communication operations of millimeter-wave system 903, as shown in FIG. 9C by communication link 922. As another example, in some embodiments, a first autonomous vehicle $902_1$ may serve as a communication relay between a second autonomous vehicle $902_2$ and base station 926 by using communication links 922 and 924. When functioning as a communication relay, an autonomous vehicle 902 advantageously forwards control data to neighboring vehicles that may not have access to directly communicate with base station 926.

It is understood that some of the embodiments described may be combined in different ways. For example, an autonomous drone 802 may serve as a communication relay between an autonomous vehicle 902 and base station 926. Other modifications and implementations are also possible.

Example embodiments of the present invention are summarized here. Other embodiments can also be understood from the entirety of the specification and the claims filed herein.

Example 1. A millimeter-wave system including: a first circuit having M channels, where M is a positive integer greater or equal to 1; one or more antennas coupled to the first circuit; and a controller including a resource scheduler module, the controller configured to operate the millimeter-wave system as a radar device and as a communication device based on an output of the resource scheduler module.

Example 2. The millimeter-wave system of example 1, where the controller is operable to configure the millimeter-wave system to operate in a first radio-frequency (RF) range when operating the millimeter-wave system as a radar device and in a second RF range when operating the millimeter-wave system as communication device, where the first RF range and the second RF range are non-overlapping.

Example 3. The millimeter-wave system of one of examples 1 or 2, where the controller is configured to operate the millimeter-wave system as a radar device and as a communication device simultaneously by configuring a first portion of the millimeter-wave system as the radar device and a second portion of the millimeter-wave system as the communication device.

Example 4. The millimeter-wave system of one of examples 1 to 3, further including a plurality of first circuits, each having M channels, the plurality of first circuits including the first circuit, each first circuit of the plurality of first circuits implemented in a respective radio-frequency integrated circuit (RFIC) of a plurality of RFICs.

Example 5. The millimeter-wave system of one of examples 1 to 4, where the first portion of the millimeter-wave system includes a first subset of the plurality of RFICs, and the second portion of the millimeter-wave system includes a second subset of the plurality of RFICs, the first subset and the second subset being mutually exclusive.

Example 6. The millimeter-wave system of one of examples 1 to 5, where the controller is configured to sequentially operate the millimeter-wave system as a radar device and then as a communication device.

Example 7. The millimeter-wave system of one of examples 1 to 6, where the first circuit includes a beamforming circuit.

Example 8. The millimeter-wave system of one of examples 1 to 7, where the beamformer circuit is configured to generate a fixed beam.

Example 9. The millimeter-wave system of one of examples 1 to 8, where the one or more antennas include M antennas, where each channel of the M channels of the first circuit is coupled to respective antenna of the M antennas.

Example 10. The millimeter-wave system of one of examples 1 to 9, where the one or more antennas include M/2 antennas, where each pair of channels of the M channels of the first circuit is coupled to a respective antenna of the M/2 antennas.

Example 11. The millimeter-wave system of one of examples 1 to 10, where each pair of channels includes a first channel that corresponds to a vertical polarization of the respective antenna and a second channel that corresponds to a horizontal polarization of the respective antenna, and where the controller is configured to operate the first channel of one pair of channels for radar operations of the radar device, and the second channel of the one pair of channels for communication operations of the communication device.

Example 12. The millimeter-wave system of one of examples 1 to 11, where the controller is configured to simultaneously operate the first channel of the one pair of channels for radar operations and the second channel of the one pair of channels for communication operations.

Example 13. The millimeter-wave system of one of examples 1 to 12, further including: a modulator/demodulator (modem); and a frequency converter circuit coupled between the modem and the first circuit.

Example 14. The millimeter-wave system of one of examples 1 to 13, where the modem includes a quadrature modulator.

Example 15. The millimeter-wave system of one of examples 1 to 14, where the frequency converter includes a mixer coupled to a bidirectional variable gain amplifier.

Example 16. The millimeter-wave system of one of examples 1 to 15, where the frequency converter includes a chain including a plurality of mixers and a plurality of bidirectional variable gain amplifiers.

Example 17. A millimeter-wave system including: a first circuit having a plurality of radio-frequency (RF) channels that are configured to be coupled to an antenna array, the first circuit configured to transmit and receive RF signals through the antenna array; and a controller configured to perform radar operations and communication operations using the first circuit, the controller operable to dynamically reconfigure the millimeter-wave system to multiplex between performing radar operations and communication operations based on an output of a scheduler module.

Example 18. The millimeter-wave system of example 17, where the controller is configured establish a communication link with a base station by performing the communication operations.

Example 19. The millimeter-wave system of one of examples 17 or 18, where the controller is configured to establish a communication link between a base station and a second millimeter-wave system by performing communication operations.

Example 20. The millimeter-wave system of one of examples 17 to 19, where the millimeter-wave system is part of a drone, and where the controller is configured to measure an altitude of the drone by performing the radar operations.

Example 21. The millimeter-wave system of one of examples 17 to 20, where the millimeter-wave system is part of a vehicle or drone, and where the controller is configured to detect objects around the vehicle or drone by performing the radar operations.

Example 22. A method of operating a millimeter-wave system, the method including: receiving a radar request; receiving a communication request; allocating hardware resources of the millimeter-wave system for radar operations and for communication operations based on the radar request and the communication request; performing radar operations with the hardware resources of the millimeter-wave system allocated for radar operations; and performing communication operations with the hardware resources of the millimeter-wave system allocated for communication operations.

Example 23. The method of example 22, further including performing the radar operations and the communication operations simultaneously.

Example 24. The method of one of examples 22 or 23, where performing the radar operations includes transmitting and receiving radio-frequency (RF) signals in a scientific and medical (ISM) band, and where performing the communication operations includes transmitting and receiving RF signals in a 5G communication band that is different than the ISM band.

Example 25. The method of one of examples 22 to 24, where performing communication operations includes transmitting and receiving data over a communication link, the method further including: using a radar beam for the radar operations; and modifying the radar beam based on data received from the communication link.

Example 26. The method of one of examples 22 to 25, where performing communication operations includes transmitting and receiving data over a communication link, the method further including: using a radar beam for the radar operations; detecting an object in a field of view of the radar beam; and transmitting location information of the detected object via the communication link.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A millimeter-wave system comprising:
a first circuit having M channels, wherein M is a positive integer greater than 1;
one or more antennas coupled to the first circuit; and
a controller comprising a resource scheduler module, the controller configured to operate the millimeter-wave system as a radar device and as a communication device based on an output of the resource scheduler module, wherein the one or more antennas comprise M/2 antennas, wherein each pair of channels of the M channels of the first circuit is coupled to a respective antenna of the M/2 antennas, wherein each pair of channels comprises a first channel that corresponds to a vertical polarization of the respective antenna and a second channel that corresponds to a horizontal polarization of the respective antenna, and wherein the controller is configured to operate the first channel of one pair of channels for radar operations of the radar device, and the second channel of the one pair of channels for communication operations of the communication device.

2. The millimeter-wave system of claim 1, wherein the controller is operable to configure the millimeter-wave system to operate in a first radio-frequency (RF) range when operating the millimeter-wave system as a radar device and in a second RF range when operating the millimeter-wave system as communication device, wherein the first RF range and the second RF range are non-overlapping.

3. The millimeter-wave system of claim 1, wherein the controller is configured to operate the millimeter-wave system as a radar device and as a communication device simultaneously by configuring a first portion of the millimeter-wave system as the radar device and a second portion of the millimeter-wave system as the communication device.

4. The millimeter-wave system of claim 3, further comprising a plurality of first circuits, each having M channels, the plurality of first circuits comprising the first circuit, each first circuit of the plurality of first circuits implemented in a respective radio-frequency integrated circuit (RFIC) of a plurality of RFICs.

5. The millimeter-wave system of claim 4, wherein the first portion of the millimeter-wave system comprises a first subset of the plurality of RFICs, and the second portion of the millimeter-wave system comprises a second subset of the plurality of RFICs, the first subset and the second subset being mutually exclusive.

6. The millimeter-wave system of claim 1, wherein the controller is configured to sequentially operate the millimeter-wave system as a radar device and then as a communication device.

7. The millimeter-wave system of claim 1, wherein the first circuit comprises a beamforming circuit.

8. The millimeter-wave system of claim 7, wherein the beamforming circuit is configured to generate a fixed beam.

9. The millimeter-wave system of claim 1, wherein the one or more antennas comprise M antennas, wherein each channel of the M channels of the first circuit is coupled to respective antenna of the M antennas.

10. The millimeter-wave system of claim 1, wherein the controller is configured to simultaneously operate the first channel of the one pair of channels for radar operations and the second channel of the one pair of channels for communication operations.

11. The millimeter-wave system of claim 1, further comprising:
a modulator/demodulator (modem); and
a frequency converter circuit coupled between the modem and the first circuit.

12. The millimeter-wave system of claim 11, wherein the modem comprises a quadrature modulator.

13. The millimeter-wave system of claim 11, wherein the frequency converter circuit comprises a mixer coupled to a bidirectional variable gain amplifier.

14. The millimeter-wave system of claim 11, wherein the frequency converter circuit comprises a chain comprising a plurality of mixers and a plurality of bidirectional variable gain amplifiers.

15. A millimeter-wave system comprising:
a first circuit having a plurality of radio-frequency (RF) channels that are configured to be coupled to an antenna array, the first circuit configured to transmit and receive RF signals through the antenna array; and
a controller configured to perform radar operations and communication operations using the first circuit, the controller operable to dynamically reconfigure the millimeter-wave system to multiplex between performing radar operations and communication operations based on an output of a scheduler module, wherein each pair of channels of the plurality of RF channels of the first circuit is coupled to a respective antenna of the antenna array, wherein each pair of channels comprises a first channel that corresponds to a vertical polarization of the respective antenna and a second channel that corresponds to a horizontal polarization of the respective antenna, and wherein the controller is configured to operate the first channel of one pair of channels for radar operations, and the second channel of the one pair of channels for communication operations.

16. The millimeter-wave system of claim 15, wherein the controller is configured to establish a communication link with a base station by performing the communication operations.

17. The millimeter-wave system of claim 15, wherein the controller is configured to establish a communication link between a base station and a second millimeter-wave system by performing communication operations.

18. The millimeter-wave system of claim 15, wherein the millimeter-wave system is part of a drone, and wherein the controller is configured to measure an altitude of the drone by performing the radar operations.

19. The millimeter-wave system of claim 15, wherein the millimeter-wave system is part of a vehicle or drone, and wherein the controller is configured to detect objects around the vehicle or drone by performing the radar operations.

20. A method of operating a millimeter-wave system, the method comprising:
receiving a radar request;
receiving a communication request;
allocating hardware resources of the millimeter-wave system for radar operations and for communication operations based on the radar request and the communication request;
performing radar operations with the hardware resources of the millimeter-wave system allocated for radar operations; and
performing communication operations with the hardware resources of the millimeter-wave system allocated for communication operations, wherein the hardware resources of the millimeter-wave system comprises a first circuit having M channels, and M/2 antennas coupled to the first circuit, wherein M is a positive integer greater than 1, wherein each pair of channels of the M channels of the first circuit is coupled to a respective antenna of the M/2 antennas, wherein each pair of channels comprises a first channel that corresponds to a vertical polarization of the respective antenna and a second channel that corresponds to a horizontal polarization of the respective antenna, wherein the first channel of one pair of channels is operated for radar operations, and the second channel of the one pair of channels is operated for communication operations.

21. The method of claim 20, further comprising performing the radar operations and the communication operations simultaneously.

22. The method of claim 20, wherein performing the radar operations comprises transmitting and receiving radio-frequency (RF) signals in a scientific and medical (ISM) band, and wherein performing the communication operations comprises transmitting and receiving RF signals in a 5G communication band that is different than the ISM band.

23. The method of claim 20, wherein performing communication operations comprises transmitting and receiving data over a communication link, the method further comprising:
using a radar beam for the radar operations; and
modifying the radar beam based on data received from the communication link.

24. The method of claim 20, wherein performing communication operations comprises transmitting and receiving data over a communication link, the method further comprising:
using a radar beam for the radar operations;
detecting an object in a field of view of the radar beam; and
transmitting location information of the detected object via the communication link.

25. The method of claim 20, wherein performing the radar operations and performing the communication operations comprises using spatial separation, temporal separation, and frequency separation between the radar operations and the communication operations.

26. The millimeter-wave system of claim 3, wherein the controller is configured cause a beam from the first portion of the millimeter-wave system to be directed to a first direction, and a beam from the second portion of the millimeter-wave system to be directed to a second direction different from the first direction so as to cause spatial separation between the radar operations and the communication operations.

* * * * *